(12) United States Patent
Reshef et al.

(10) Patent No.: US 6,321,337 B1
(45) Date of Patent: Nov. 20, 2001

(54) METHOD AND SYSTEM FOR PROTECTING OPERATIONS OF TRUSTED INTERNAL NETWORKS

(75) Inventors: Eran Reshef, Lehavim; Gil Raanan, Zoran; Eilon Solan, Herzelia, all of (IL)

(73) Assignee: Sanctum Ltd., Tel-Aviv (IL)

( * ) Notice: Subject to any disclaimer, the term of this patent is extended or adjusted under 35 U.S.C. 154(b) by 0 days.

(21) Appl. No.: 09/149,911

(22) Filed: Sep. 9, 1998

Related U.S. Application Data

(60) Provisional application No. 60/058,280, filed on Sep. 9, 1997.

(51) Int. Cl.$^7$ .................................................. G06F 12/14
(52) U.S. Cl. .................................... 713/201; 713/200
(58) Field of Search .................. 713/200, 201, 713/202, 151, 152, 153; 709/225, 227, 229, 230, 232

(56) References Cited

U.S. PATENT DOCUMENTS

| | | |
|---|---|---|
| 5,073,933 | 12/1991 | Rosenthal . |
| 5,166,977 | 11/1992 | Ross ....................................... 380/18 |
| 5,191,611 | 3/1993 | Lang . |
| 5,220,604 | 6/1993 | Gasser et al. . |
| 5,224,163 | 6/1993 | Gasser et al. . |
| 5,315,657 | 5/1994 | Abadi et al. . |
| 5,392,390 | 2/1995 | Crozier . |
| 5,495,580 | 2/1996 | Osman . |
| 5,550,984 | 8/1996 | Gelb . |
| 5,586,260 | 12/1996 | Hu . |
| 5,623,601 | 4/1997 | Vu . |
| 5,657,390 | 8/1997 | Elgamal et al. . |
| 5,764,890 | 6/1998 | Glasser et al. . |
| 5,774,695 | 6/1998 | Autrey et al. ......................... 709/227 |
| 5,778,174 | 7/1998 | Cain . |
| 5,778,189 | 7/1998 | Kimura et al. ........................ 709/236 |
| 5,781,550 | 7/1998 | Templin et al. . |
| 5,793,966 | 8/1998 | Amstein et al. . |
| 5,850,388 | 12/1998 | Anderson et al. ..................... 714/39 |
| 5,892,900 | 4/1999 | Ginter et al. . |
| 5,910,987 | 6/1999 | Ginter et al. . |
| 5,915,019 | 6/1999 | Ginter et al. . |
| 5,917,912 | 6/1999 | Ginter et al. . |
| 5,933,498 | 8/1999 | Schneck et al. . |
| 5,941,947 | 8/1999 | Brown et al. . |
| 5,944,794 | 8/1999 | Okamoto et al. . |
| 5,949,876 | 9/1999 | Ginter et al. . |
| 5,982,891 | 11/1999 | Ginter et al. . |
| 5,983,270 | 11/1999 | Abraham et al. . |

FOREIGN PATENT DOCUMENTS

WO 99/46882   9/1999   (WO) .

*Primary Examiner*—James P. Trammell
*Assistant Examiner*—Pierre E. Elisca
(74) *Attorney, Agent, or Firm*—Brown Raysman Millstein Felder & Steiner LLP

(57) ABSTRACT

The present invention is a security gateway system positioned between an external, untrusted computing environment and an internal, trusted computing environment that converts messages received from the external environment into simplified messages and converts the simplified messages into messages suitable for use on the internal environment. The conversion involves the removal of external environment transfer protocols and the reduction of the content of the messages left after removing the protocols into a simplified representation of the content to create a simplified message. The simplified representation is then converted to an internal message by converting the simplified representation to a representation appropriate to the internal environment, including to applications operating on the internal environment, and adding internal environment protocols, including transfer protocols, to the converted message. Simplified representations exist for some but not necessarily all types of content which may be received from the external environment, thus limiting the content which may be passed from the external to the internal environment.

24 Claims, 13 Drawing Sheets

| From | to PE | rule | condition |
|---|---|---|---|
| (start) | TCP/IP | "TRUE" | |
| TCP/IP | HTTP | Post=80 | |
| HTTP | CGI | command="POST" + PATH="#/cgi-bin" | |
| CGI | BILL-VIEW | CGI-parameter= "bill-view-opp" | |
| CGI | PAYMENT | CGI-parameter= "payment" + user <>guest | |
| ... | ... | ... | ... |

METHOD AND SYSTEM FOR PROTECTING OPERATIONS OF TRUSTED INTERNAL NETWORKS

RELATED APPLICATIONS

This application is related to pending provisional application No. 60/058,280 titled METHOD AND APPARATUS FOR INSULATING A COMPUTER OR NETWORK FROM AN EXTERNAL COMPUTER OR NETWORK, filed Sep. 9,1997, which is hereby incorporated by reference into this application. Applicants hereby claim the benefit of such provisional application.

BACKGROUND OF THE INVENTION

The present invention pertains to methods and systems for preventing unauthorized access to computers and networks and for assuring the security of applications executing on computers and networks. More particularly, the invention is directed to providing protection to trusted, internal networks from external attacks and the intentional or inadvertent introduction of bugs or viruses.

Much work has been done in the area of computer and network security. The problems addressed in the network context, and their solutions, vary widely in type, scope and severity. Some of the primary existing solutions such as firewalls are described below. Despite the great effort devoted to these issues, however, many problems persist which are not solved by existing solutions.

For example, a web server or application server operating on an internal, trusted network is very often connected to external networks such as the Internet in a way which restricts the external, untrusted networks' access to the resources of the internal environment. The protection of this internal trusted environment from outside interference, intentional or inadvertent, by a firewall that simply selects which TCP/IP packets can enter that environment based on their TCP/IP format, does not take into account the likelihood that there are strategic weaknesses in software operating in that trusted environment. Because most firewalls only operate at the network layer, analyzing transport protocol formats, they cannot defend the applications and middleware operating on that network.

For example, the server may have bugs in its operating system or its protocol stacks may have peculiarities that invite mischievous interference. Also, a particular application that is using the server to communicate with the outside world may be a legacy application or one that is simply not well designed for operation in the hostile on-line environment. This one application may make the rest of the operations in that protected environment vulnerable.

The protective measures currently made available for blocking such outside interference and assuring internal operational integrity fall short of that goal both in theory and in practice. These conventional measures as described briefly below, include dual-homed firewalls, bastions, filtering, hardened operating systems, and access servers.

Dual-homed firewalls perform network address translation and filtering on data packets at the network level, e.g., TCP/IP packets. These networks also translate the server-based addresses, addresses made available by the internal network as its domain name system for use by incoming data packets, into addresses internal to an organization's internal network. Only the data packets that have passed inspection by the packet filter's access control list (ACL) receive the internal addresses. For instance, the ACL may permit file transfer protocol (FTP) traffic to pass only if it is addressed to a certain part of the trusted environment.

Application level proxy operations or bastions are types of firewalls that separate external client applications, which may be hostile, from the internal server's operations. This operational separation is achieved by the proxy's simulating a server side application to an independent client, while simulating the client side application to an independent server. Application data is passed between these two simulated proxy halves.

Context filtering involves accumulating a table of data related to incoming packets and authorizing a session only if the data for these packets is consistent with session criteria for that data.

Hardened operating systems reinforce the application server against exploitation and against bugs affecting the operating system. For example, the separation of the client and server within a bastion server can be enhanced by disabling the forwarding of incoming messages using their native protocol. This prevents exploitation of the operating system by "IP in IP" encapsulation, for example, which sends TCP/IP packets as payload data inside an outer TCP/IP wrapper. Removing the TCP/IP wrapper would leave a potentially mischievous TCP/IP packet intact. Disabling all TCP/IP forwarding assures that the message forwarded is in a format different from its native TCP/IP format. Barricaded operating systems are further hardened by stripping away all but a severely-limited set of functions, so that the processors respond to incoming messages only as daemons, as discussed in U.S. Pat. No. 5,778,174.

Access servers are used to enhance application level security within a network by performing access-control filtering tasks on specially-secured machines, in addition to access control at the network level. Bastion servers act at the higher, application-level of the open systems interconnection model as proxies for the internal server. These proxy servers screen the data payload of incoming packets using rules specific to each application. These rules bar given formats, syntaxes, or combinations of these from being passed through the proxy. However, these rules may hide valuable data from the internal system. These proxies have been seen as bottlenecks, which makes the use of "cut-through" strategies attractive, because they use proxies only intermittently. Application-leveling filtering has also been seen as a security architecture that is not readily scaled up to meet increased volume and diversity in the data stream.

One weakness of many conventional solutions, even those that do provide application-level filtering, is that they do not "positively" identify the safe data expected by the protected system. That is, the filtering rules they use are usually directed solely to information that is to be excluded. Such rules are limited by history, and represent previously-encountered attempts at exploitation or attack. A patchwork of past experiences such as this cannot and indeed does not guarantee security. This is evident from the numerous reports each month of new security breaches affecting each major application, operating system and network control package in use today.

New opportunities for unauthorized access are added each time new functions are added to an internal system. For example when a bank opens up bank-at-home access for customers, it creates an opening through a firewall that provides a TCP/IP filter and an authorization proxy into the bank's virtual private network (VPN). If the design of the legacy accounting software formerly used only by bank employees still permits administrative correction of accounts, the accounts are vulnerable to hackers despite the firewall and the private network. In another example, if a publisher adds "guest account" access to a list of book previews to the its server's functions, the list of the books previously available in full text only to authorized employee and customer accounts may become vulnerable to hacking. These are examples of how newly-emerged, application-specific network security problems are inadvertently added, one at a time, to a system. However addressing them one at a time, through incremental changes in the design of the network's security, is self-defeating.

As a general, practical matter, conventional, incremental solutions are often useless, because the attempts at attack and exploitation that do succeed frequently bypass them and directly affect the applications and then sometimes turn and attack the security operation itself. The practical reason for such ominous successes is the risk inherent in the very size and complexity of the security software being used. Complexity and large size are unavoidable when security operations are implemented by programs using standard, general-purpose architectural software components.

Furthermore, it is statistically certain that large and complex software packages will contain bugs, at least the inadvertent bugs produced and rendered more difficult to detect by the sheer size of the software code listing. These are merely the predictable products of human error, such as design mistakes and coding errors. Attackers have become proficient at finding and exploiting these bugs to their advantage.

However, because such attacks require code that breaches the normative rules used to verify the software, once software is verified not only is it operationally more robust, it is less vulnerable to direct attack, and to attempts to exploit other protected resources through it. Unfortunately, at present, formal verification of software design and implementation can be applied only to small chunks of software. Therefore, verification is effectively unavailable for the large, complex software packages that may need it most.

Thus, there is a need to a method and system for more effectively protecting internal trusted computing environments from attacks from external computing environments.

SUMMARY OF THE INVENTION

It is an object of the present invention to solve the problems discussed above associated with existing security and integrity systems.

It is another object of the invention to limit communications between an external, untrusted environment and an internal trusted environment which effectively shields the internal environment from data potentially harmful to the internal environment.

It is another object of the present invention to allow users to specify a set of simplified representations of content data which is allowed to pass from an external computing environment to an internal computing environment, and to prevent any content data other than the specified data to pass to the internal environment by converting all allowable data into the simplified representations.

These and other objects of the invention are achieved by a security gateway system positioned between an external, untrusted computing environment and an internal, trusted computing environment that converts messages received from the external environment into simplified messages and converts the simplified messages into messages suitable for use on the internal environment. The conversion involves the removal of external environment transfer protocols and the reduction of the content of the messages left after removing the protocols into a simplified representation of the content to create a simplified message. The simplified representation is then converted to an internal message by converting the simplified representation to a representation appropriate to the internal environment, including to applications operating on the internal environment, and adding internal environment protocols, including application protocols, to the converted message. Simplified representations exist for some but not necessarily all types of content which may be received from the external environment, thus limiting the content which may be passed from the external to the internal environment.

The security gateway system protects a computer, a computer resource, a network or sub-network from computer security policy breaches and from attacks such as intrusions that exploit an operating system to damage files, flood buffers, or activate an application-program bug that compromises the confidentiality or performance of the application. The gateway system is a robust, thorough, effective, and elegant solution to the problem of protecting the security and integrity of a trusted network, computer and the applications executing on them. Furthermore, the gateway system has an architecture which is conducive to simpler verification, improving the robustness of the system and the protection afforded to the trusted environment.

In preferred embodiments of the invention, the security gateway system includes independently-controlled complementary computer processing entities that insulate the trusted environment from the untrusted environment. These complementary independently-controlled processing entities are sometimes referred to hereafter as interior and exterior "robots", with the exterior robot being connected to the untrusted environment and the interior robot being connected to the trusted environment. The external robot reduces all data received from the external computing environment to a simplified form harmless to the internal environment, and the internal robot similarly reduces data received from the internal environment for transfer to the external robot, which converts the to data to a form suitable for transmission on the external environment.

In a first particular embodiment, the robots are implemented in two independent computers. In a second particular embodiment, the security gateway resides within a single computer that is linked to both external and internal environments, such as a network including terminals accessible to unauthorized persons or simply a less-secure resource in the same computer. In this embodiment, the gateway system may include a monitor program to create a protected, virtual machine on a single processor and insure the separation of the two robots' resources and their operational independence. The robots may be two independent computer processes that execute in alternate time slices on a single CPU. Alternatively, one of these processes executes on an add-in CPU processor. The robot processes isolate the internal and external environments from each other, so that the single computer itself separates the trusted environment from an untrusted environment.

The robots pass messages to each other over a dedicated communication link using a transport protocol internal to the security unit. Because the communication link connects only the two robots, the transfer protocol may be very simple, having meta data about the content of the simplified message such as length and number of data items, but need not have any routing information. The message format and the format of the payload or content of the message is translated and then re-translated by the robots using a translator and interpreter for an internal application protocol specific to the application protocol of the message received by the security system.

When either robot receives a message, it converts the message using a particular internal application-protocol translator and a particular internal transport-protocol translator, respectively. The second robot converts the data from the respective internal protocol, interpreting it as data compliant with the original application or transfer protocol, respectively and the security policy of the trusted environment. Spurious data is thus eliminated by this methodology. Because the security gateway system only transmits compliant data, and the data is transmitted and received only in non-standard protocol formats, even if the external robot is compromised it cannot pass harmful commands to the internal robot.

In a further embodiment, compliant data may also be verified by acceptance tests. In a particular embodiment, the acceptance test is an access-control test in which the data must also be compliant with a list of valid users and the actions that are authorized for those users. In another particular embodiment, a context-sensitive acceptance test is used to provide privileged access to graphical or audio devices.

Because the internal robot receives only safe inputs, the internal robot can be relatively simple. Because it is relatively simple, it can be formally verified with relative simplicity. Since the reliability of this internal robot is critical to the security of the trusted environment, the confidence level for the trusted environment is extremely high. Furthermore, the gateway system only transmits compliant data across the communications link between robots, and the data is transmitted and received only in the non-standard ART protocol formats not implemented outside the security gateway. Thus, even if the external robot is compromised it cannot pass harmful commands to the internal robot. As a result, formal verification of the internal robot serves as formal verification of the gateway system as a whole.

Conceptually, the delineation of a trusted internal computing environment is an arbitrary one that can be applied to a specific computer resource, such as a disk drive, memory space or add-in card, or expanded to include an entire computer or network. Similarly, the untrusted external environment can be thought of as including everything that is not a part of the trusted environment or only focus on particularly problematic areas such as the Internet.

For example, protecting a company's internal network as its trusted environment includes protecting it from any security breach or attack incident to information exchanges with the networks operated by vendors and suppliers who access the company's inventory data, and with company employees dialing in from remote locations or using Internet connections, and so on. However, a device on the LAN itself, or even a laptop computer or a hand held device such as the Palm Pilot™ manufactured by U.S. Robotics™ that may be temporarily connected to the LAN, may cause a security breach or be the source of an attack on its own trusted environment.

BRIEF DESCRIPTION OF THE DRAWINGS

The present invention will be better understood when the detailed description of presently preferred embodiments given below is considered in conjunction with the drawings provided, wherein:

FIG. 9 is a sample of a protocol entity table shown in the apparatus of FIG. 5.

In these drawings, like items are assigned like reference numerals.

DETAILED DESCRIPTION OF PREFERRED EMBODIMENTS

The system and method of preferred embodiments of the present invention are now described with reference to the drawings.

Figure 1A:
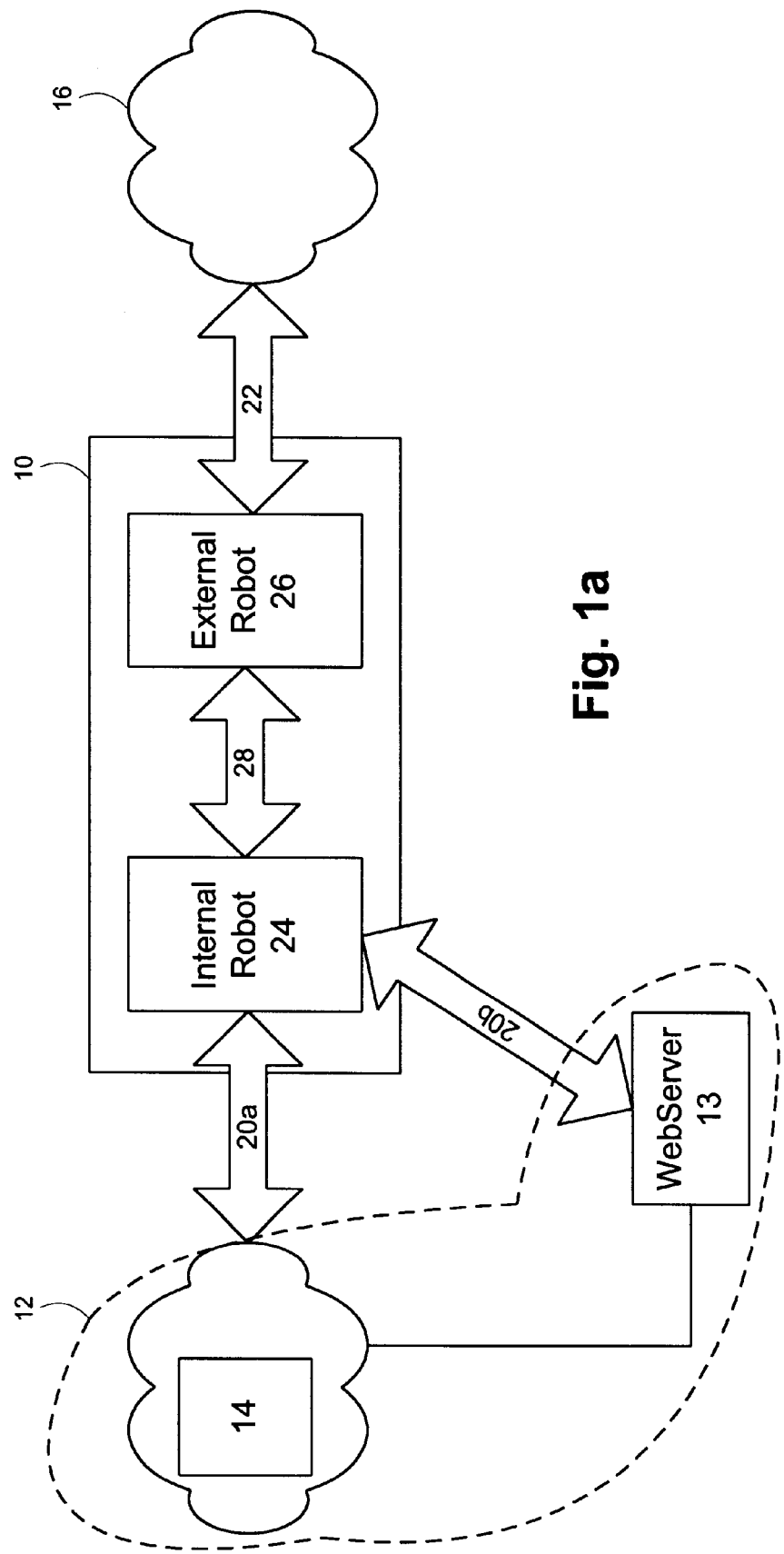
FIG. 1a is a block diagram of a gateway system connected between an internal and external computing environment of one preferred embodiment of the present invention.

Referring to FIG. 1a, a network security gateway 10 is connected between an internal computing environment 12 and an external computing environment 16. In the embodiment shown in FIG. 1a, the internal computing environment contains a web server 13, which may belong to a web subnet, and a sensitive system server 14. The external environment 16 may be any environment external to the web and system servers 13, 14, but typically includes the Internet. The gateway 10 is connected to the internal system server 14 via communication bus 20a, to the web server 13 via bus 20b, and to the external environment via bus 22. These buses may be implemented as Ethernet connections, using conventional network interface cards such as Ethernet PCI cards, or may be implemented as serial connections using a V.35 interface. Other connection methods may be used as known to those of skill in the art. The buses 20a, 20b, and 22 may use the same or different types of connections.

The security gateway 10 contains two separate and distinct processing entities 24, 26, referred to herein as robots, connected via a dedicated, secure communication bus 28. The internal robot 24 is connected to the web server 13 and system server 14 via the buses 20b, 20a, respectively, and the external robot 26 is connected to the Internet or other external environment 16 via the bus 22. As described in greater detail below, each robot is capable of translating or reducing a communication or message received from the respective environment to a simplified message using a simplified protocol format referred to herein as a clear inter-protocol or CIP, transmitting the CIP message to the other robot using the inter-robot bus 28 using an inter-robot transfer protocol or IRP, and translating such CIP messages received from the other robot into messages formatted for the respective environment.

In one embodiment, the security gateway 10 is connected to an organization's internal networks in the following manner. An application proxy is connected through bus 20a to the internal system server 14, and a web proxy is connected through bus 20b to the web subnet wherein the web-server 13 resides. As one skilled in the art will appreciate, it is possible to have multiple web-subnets, with a dedicated interface per each, or to have several web servers in the same subnet; likewise it is possible for the apparatus to serve multiple internal environments with a dedicated interface per each, and also several servers and/or applications in the same internal zone. The embodiment described with reference to FIG. 1a services a single internal environment with a single server running a single application, and a single web-server in a single web-subnet, for reasons of simplicity and ease of implementation. However, the principle of replication and extension of the gateway system 10 is a system design parameter understood by those of skill in the art.

Figure 1B:
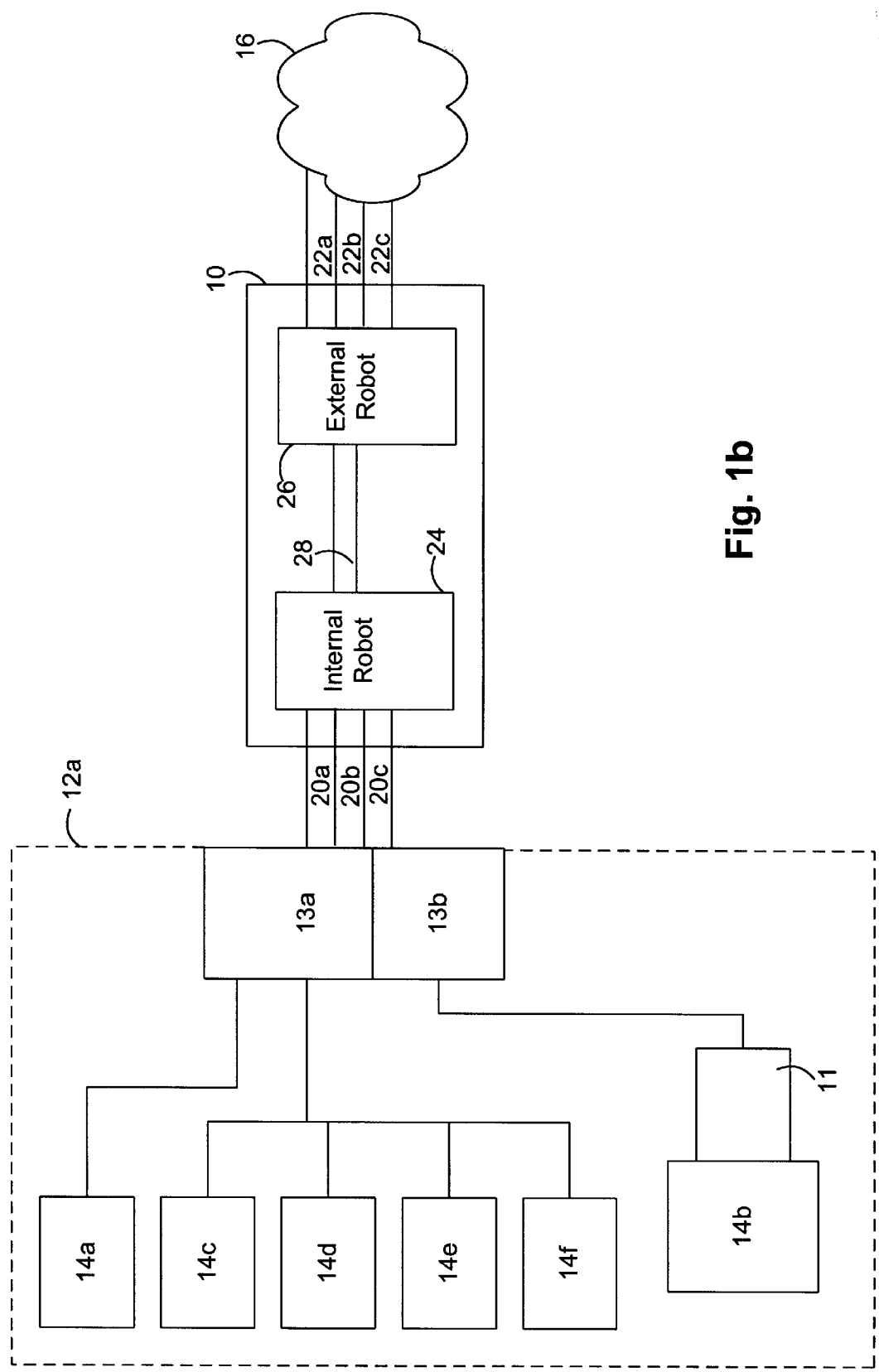
FIG. 1b is a block diagram showing an alternative architecture for a gateway system connected between an internal computing environment connected to the Internet in accordance with the present invention.

For example, FIG. 1b illustrates an alternative architecture which may be used for the internal environment 12a. As shown in FIG. 1b, a LAN server 13a is connected to the internal robot 24 via several interfaces 20a, 20b, 20c. The LAN server 13a services communications for a number of internal application servers 14a–14f, including for example an SQL database server 14a and a banking server 14b having its own additional server security process 11 that provides access control and other security measures. The three interfaces 20a, 20b, and 20c provide for a variety of communication protocols to be used, including one 20a for issuing SQL commands to the SQL database server 14a, one 20b for transmitting email and web communication protocols including CGI calls within HTML data, and one 20c for high security financial communication protocols specific to the banking server 14b. Corresponding multiple interfaces 22a–22c may be provided between the external robot 26 and external environment 16 to receive message having various communication protocols.

There may be a separate processing module for each message protocol or this combination may be streamlined to provide one module for the "gateway" transfer protocols implemented in the security gateway, one for "middleware" protocols that bypass the web server, perhaps also one for encryption protocols and one for applications protocols. The streamlined alternative does away with the system overhead incurred by the double-filtering of HTTP-protocol messages that otherwise occurs to less than that of a linear addition, while being free of obvious security flaws or leaks and still blocking tapping. On the other hand, a very "strong" machine with advanced operating system performance and features, such as a SUN SPARC station is required to run it, adding to its overall cost for low-end users. The advantage of the modular design is the economies of being able to selectively implement additional protocols by adding individual modules specific to the tasks at hand.

The internal communications bus 28 connects the respective robots 24, 26 in accordance with the serial bus, parallel bus or universal serial bus standard. In accordance with the present invention the internal bus 28 linking the two robots may, alternatively, be a SCSI bus, fiber-optic, a network interface link or even a radio link, where the robots must operate over a greater distance, VMM-protected shared memory, or the like.

Together, these three elements 24, 26, 28 implement the protection provided by the network security gateway 10 for the protected internal environment 12. The robots 24, 26 are two separate and independent logical processes that execute routines defined by respective security gateway software packages. The robots 24, 26 may be installed on two separate processing devices or one a single processing device operating the one or both of the robots 24, 26 in protected mode.

In some embodiments, the respective software packages are installed on two or more respective separate CPUs, for the sake of simplicity and off-the-shelf component availability. In this approach, each robot runs on a single independent computer processor with non-shared resources assigned to it (for example, disk space, memory address, network adapter, various peripherals, and the like). The only shared resource in this approach is the communication bus 28. Several configurations may be used to implement this approach. One such configuration is different independent computers (PCs) connected by a communication bus like a serial line, SCSI line and the like, with each PC having at least another network adapter for communicating with the internal network or the rest of the external world. Alternatively, one robot program may run on a computer (PC) and the other on an add-on card, which may be a dedicated card or device, or a standard card (like Intel 80×86 add-on card), installed in one slot of the PC, with this slot serving as the communication bus 28. Both the PC and the add-on card have at least one additional network adapter for communicating with the internal network or the rest of the external environment. The two robot programs may also be run on different independent processors implemented on a standard (e.g., dual Intel 80×86 processors card) or a dedicated add-on card. These two processors are connected by a communication bus like a SCSI line, IDE bus, PCI bus, and the like. Each robot also includes at least another network adapter for communicating with the internal environment 12 or the external environment 16. This add-on card is installed in a standard or dedicated network communications device like a router, bridge, communication server, and the like.

In other embodiments, the two robots 24, 26 are implemented on a single CPU using a protected mode such as the VM86 mode provided by VMM and Pentium technology. For example, in a single CPU running the Windows NT™ (WINNT) operating system, each robot, or at least the external robot 26, is operated in protected mode under the supervision of a monitor program or "mediator" which prevents each robot from affecting the operation of the other and the rest of the CPU's environment. The monitor program also negotiates the communication of data between them, implementing the communication channel 28 between them using shared memory resources and a special API for each protected mode. Thus, the two software robots 24, 26 are separated by the CPU under the control of the VMM program in a way that each robot is assigned some resources of the computer (such as disk space, memory address range, peripheral devices like floppy disks or tape drives) which are not shared with the other robot, and the policy of separation is enforced by the VMM program. Only one resource, the communication bus 28, is shared by the two robots 24, 26, and this bus 28 may be implemented, for example, by a dedicated memory address space.

The VMM and the robots running in their private environments may be executed on a dedicated computer. They may also run on a non-dedicated computer, in which case certain modification to the standard OS (e.g., Windows) might be necessary in order to force it to run in a protected mode. The VMM program controls all the events at the CPU level, and enforces the two virtual processing entities on a single CPU machine by hardware interrupts.

Structure and Operation of the External and Internal Robots

The external and internal robots 26, 24 are now described in more detail with reference to FIGS. 2a and 2b.

Figure 2A:
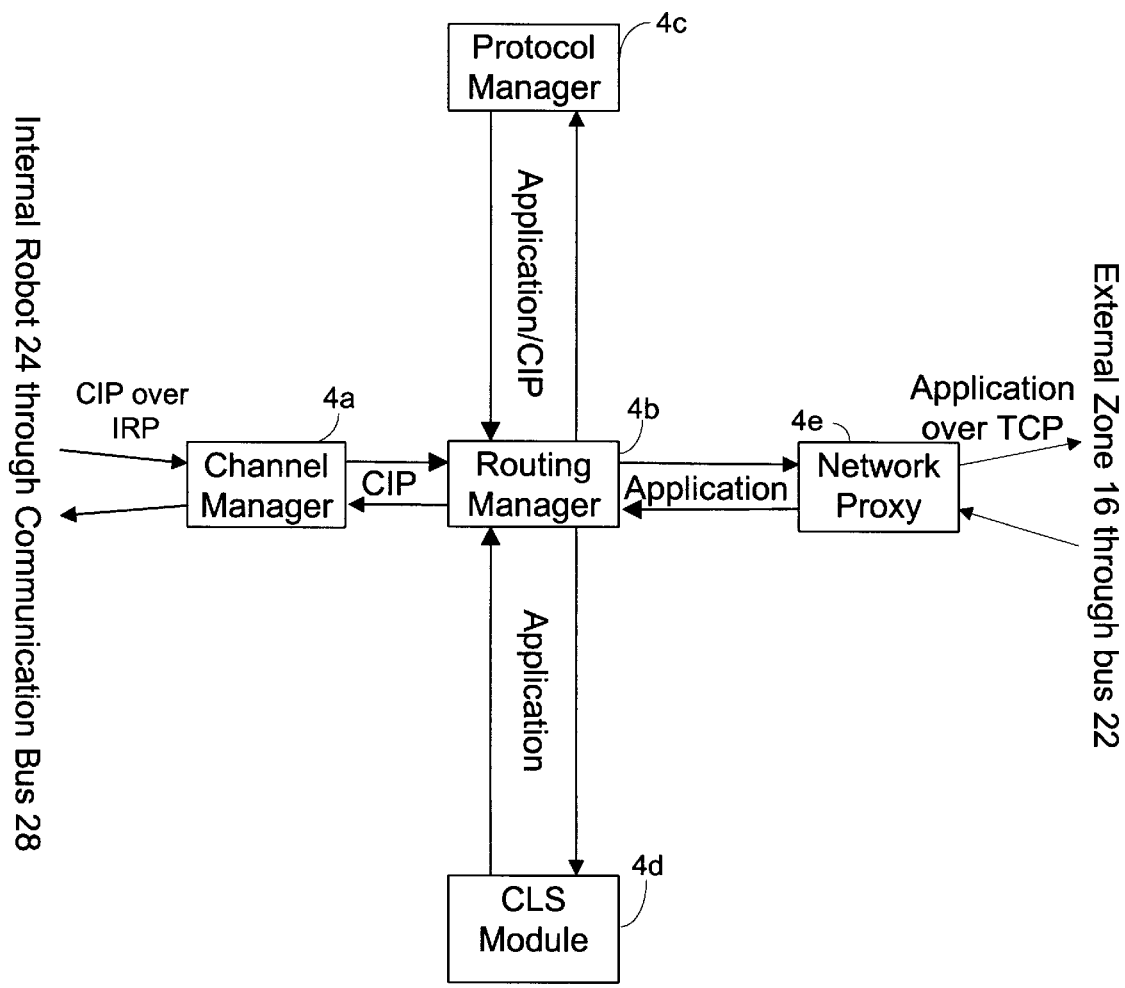
FIGS. 2a and 2b are block diagrams of the external and internal robots, respectively, shown in FIGS. 1a and 1b.

Referring to FIG. 2a, the external robot 26 contains a channel manager 4a for wrapping outgoing CIP messages to the internal robot 24 in the inter-robot protocol or IRP and removing the IRP from incoming messages. The external robot also contains a network proxy 4e which wraps messages in TCP/IP or other transfer protocols used in the external environment 16. These protocols may include TCP/IP, UDP, SPX/IPX, HTTP, SNA, NCP, CORBA, RMI, RPC, or communications transfer protocols. The CIP is also specific to the application protocol used, such as SMTP, POP3, SQL, CGI, and applications-specific protocols such as those used in banking. Because the protected environment 12 may use the secure hypertext translation protocol (S-HTTP) over TCP/IP (or likewise security scheme, e.g. SSL) and structured query language (SQL) over TCP/IP, as well as a specialized financial communication protocol and application protocol, the robots may need respective complementary sets of at least three CIP protocol stacks.

The external robot further contains a routing manager 4b for routing CIP or application format messages between the various elements of the external robot 26, a protocol manager 4c connected to the routing manager 4b for reducing a message from the application format received from the external environment 16 to the CIP in accordance with procedures described further below, and a Communication Layer Security (CLS) routine 4d which provides decryption and authentication services for the security gateway 10 under the direction of the routing manager 4b. The routing manager 4b first forwards application messages to the CLS routine 4d, and then forwards the authenticated, decrypted data from the message to the protocol manager 4c. The protocol manager 4c reduces the native-application protocols it receives from the untrusted environment into a respective CIP format for its particular native protocol(s). The channel manager 4a in the external robot 26 then moves the CIP formatted data onto the inter-robot communication bus 28.

Figure 2B:
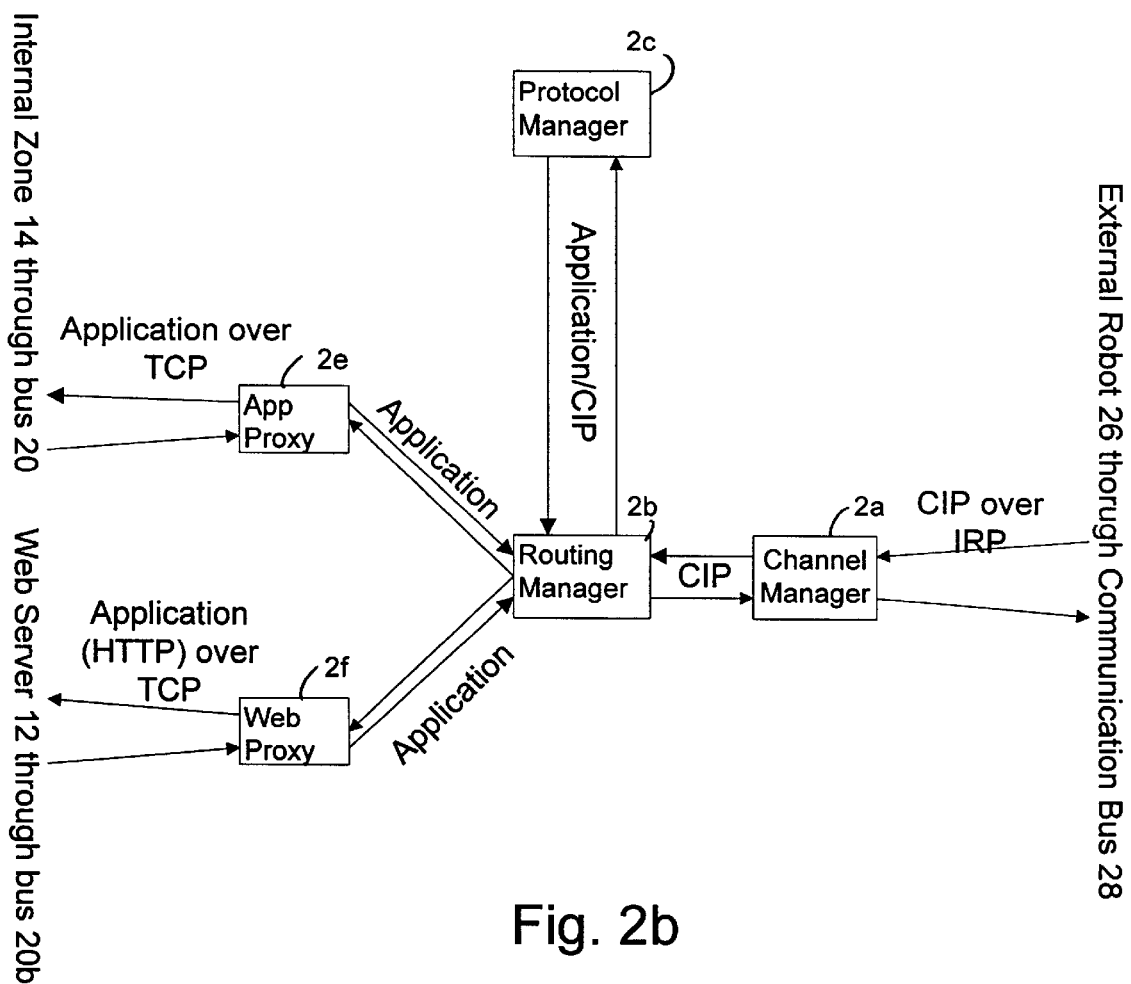

As seen in FIG. 2b, the internal robot 24 has an architecture similar to the external robot 26. The internal robot 24 thus contains a channel manager 2a similar to channel manager 4a of the external robot 26, a routing manager 2b, a protocol manager 2c, and a number of proxies depending upon the architecture of the internal environment. Given the internal environment illustrated in FIG. 1a, the proxies include an application proxy 2e and a web proxy 2f.

Data received by the channel manager 2a of the internal robot 24 is forwarded to its protocol manager 2c under the direction of its routing manager 2b to be retranslated from the CIP format back into respective native application protocols, and then the retranslated result is sent to the internal environment 12 through the application proxy 2e and the bus 20a or through the web proxy 2f to the web-server 13 which responds in a data stream which is sent back to the gateway 10 through the bus 20b to the web-proxy 2f and then re-directed into the protected system server 14.

Although these various tasks are described as being carried out in separate modules in this embodiment, so long as analogous functions are provided so that they cooperate in producing the described result, these tasks may be grouped, divided between different modules or appended to each other or elsewhere. For example, the security functions (as performed for example, by CLS module 4d) can be divided between the internal and the external robot, perhaps in order to provide better security for the cryptographic variables stored in it (keys and signatures).

The communication between the external robot and the internal robot is carried out solely through a dedicated simple inter-robot protocol or IRP, over the dedicated inter-robot bus 28. The data is translated using a security protocol specific to the applications protocol of the data received and internal to the security gateway operation. Applications within the trusted environment can configure the robots to authorize data flows using selected communications transfer protocols (CTP), such as the simple mail transfer protocol (SMTP), file transfer protocol (FTP) and secure electronic transfer (SET) protocol. Preferably, the CIP assigned to a communication is specific to the CTP in use.

Any breach of the permitted flow sequences by disorderly operating system calls or looping will be trapped and logged. For example, in the file transfer protocol (FTP) a GET command cannot be recognized unless preceded by a successful login sequence including the USER command, followed by a PASS command. Violation of the required flow order will cause an alarm to be logged and terminate the FTP session. The gateway 10 further enforces data flow requirements, since each translator and interpreter pair is a pair of ad hoc transforms derivative of the protocol used in the incoming message and the types of data flow permitted by the security administrator. For example, if an external SMTP user issues the "MAIL FROM" command, the external server will send the ART equivalent of a "MAIL FROM" command, only when it follows a "HELO" command.

Figure 3A:
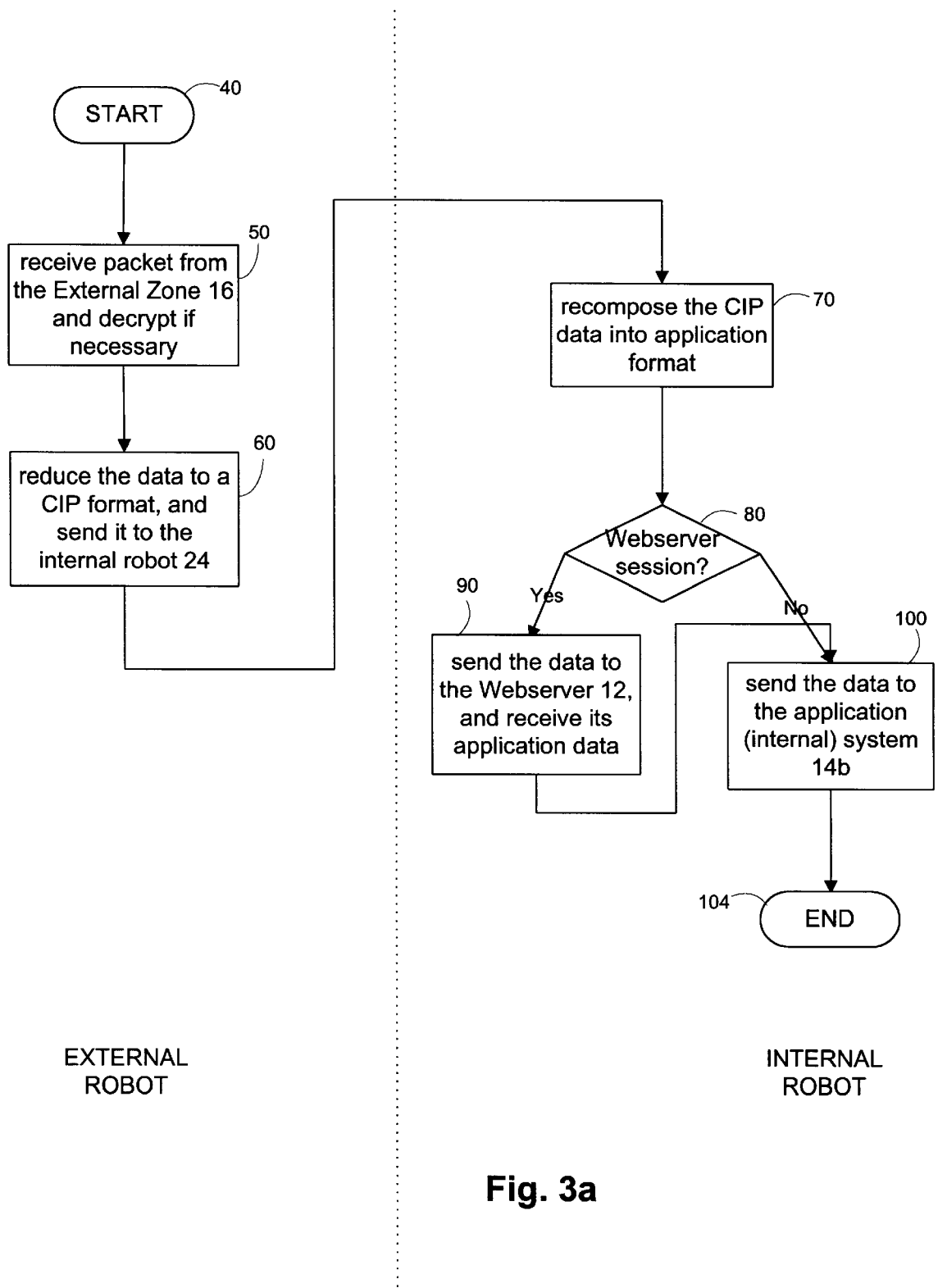
FIG. 3a is a flow chart showing a process of processing incoming data performed by the apparatus of FIG. 1a in accordance with an embodiments of the present invention.
Figure 3B:
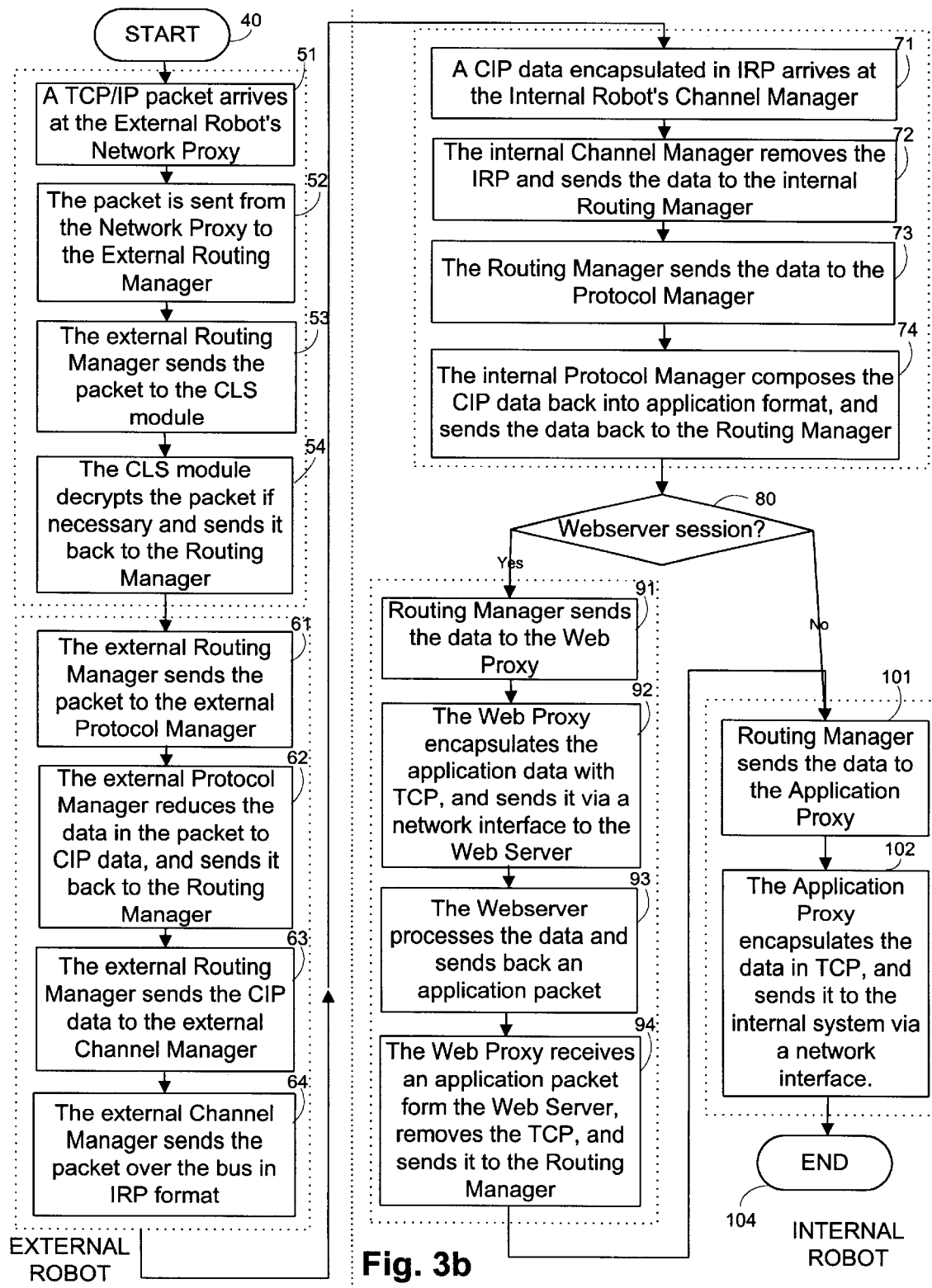
FIG. 3b is a flow chart showing the process shown in FIG. 3 in greater detail, referring to elements of the block diagrams shown in FIGS. 2a and 2b.

FIGS. 3a and 3b show the data flow implemented by the apparatus shown in FIGS. 1a, 2a and 2b. In overview as shown in FIG. 3a, at the start 40 of the process, communications packets received from the external environment 16 are time stamped and logged by the external robot 26, step 50, followed by the data-security processing functions such as decryption to plain data. Logging is initiated by a synchronous API module within the security gateway on a "write once" media (e.g. CDW). The logging process performs sparse notations of program state changes, time-stamped message IDs, system errors, access and flow violation attempts, rule firing for each packet, etc.

Generally error and debug entries are kept in greater detail than the message and state entries. Each service module is automatically periodically polled to maintain a complete audit trail of every administrator action, user login/logout, database error, simplified network management protocol trap or alarm. A database of known intrusion patterns is provided and habitual usage patterns of groups within the trusted environment are monitored and the administrator notified of incidents that diverge from that pattern.

For the sake of security, the log is accessed locally only through the internal, trusted terminal. However, external logs are securely copied to the internal record using the internal CIP protocol corresponding to the external log's native protocol and interpreted into an item format distinct from that used by internal entries, to further frustrate counterfeiting. Alternatively, the external logs may be written to a separate system to decrease the overhead imposed on the internal robot by the logging process. A "dual Channel Manager structure" wherein there is an additional Channel Manager in each robot, dedicated for logging messages, may also be used. The software to handle the logging may use the ACE package or any other commercial product for the implementation. The internal and external logs are recorded asynchronously, using a logger daemon, so that logged items go immediately to the written record without waiting in vulnerable queues during thread lockouts or I/O busy states. This can be implemented by an asynchronous wrapper using generic OS logging, such as UNIX's Syslogd & MSEvent-Logger for errors and violations, and an ODBC-standard file structure for the transactional information concerning program state and messages. The open data base convention (ODBC) logger has some asynchronous behavior options, but they are not directly applicable, so it may not represent a realistic alternative.

Then in step 60, the plain data is edited to reduce it to clear data and then translated into CIP format, after which the CIP format is sent over the security gateway's internal communication bus 28 to the internal robot 24. At step 70, the internal robot 24 retranslates, and perhaps also reconstructs, the data from its CIP format back to the format native to the application it is addressed to, perhaps introducing some further editorial changes.

In step 90, if the data belongs to a web-session (HTTP) it is first sent to the web-server 12, the web-server 12 may then initiate an application request, sending a response back to the Internet source of the data the web server received, back through that network-security gateway 10, while the data proceeds to its destination, as noted in step 100. If, on the other hand, the data does not belong to a web-session, such as data communicated directly to the application server, then the internal robot simply sends that data to the application proxy 2e and over the bus 20a to the internal environment 14, comprising step 100 and finishing the security gateway's security-assurance process at step 104.

More specifically, referring to FIG. 3b, if a TCP/IP packet, or some other basic unit of data associated with a suitable communications protocol for the media available, is received by a security gateway proxy 4e corresponding to that protocol, through the external bus 22, it is logged in by the external robot at step 51. This records the packet's ID number and operational state codes representing the transfer steps completed for the packet. However, since this robot is barricaded, detailed logs are not kept.

At step 52 the security gateway proxy 4e, after having removed the encapsulation provided by TCP/IP or by some other transport protocol used for communicating the data to the security gateway, sends the data to the routing manager 4b which forwards it to the Communication Layer Security (CLS) module at step 53. At step 54 the CLS module decrypts the SSL format, if such encryption is present (or any other security scheme, e.g. S-HTTP), of the message and interfaces with and mediates information required by "mechanisms" that authenticate the identity of the sender, if such authentication is needed, thus providing plain application-format data to the routing manager 4b. Preferably, the public key infrastructure is used for the decryption.

The routing manager 4b then sends the plain application-format data to the protocol manager 4c which edits the application data into clear data and translates it into CIP format at step 61. The protocol manager 4c then moves the CIP data back to the routing manager 4b at step 62. The routing manager 4b sends the CIP data on to the channel manager 4a at step 63, which encapsulates the CIP data using the IRP, transmitting this IRP-encapsulated CIP-format data to the internal robot 24 over the internal communication bus 28 in step 64. The IRP transport protocol may encapsulate CIP data originating from different native application and transport protocols.

The CIP-format data, encapsulated in accordance with the internal IRP transport protocol, is received from the internal-communication bus 28 by the channel manager 2a in step 71. The channel manager 2a removes the IRP encapsulation and sends the CIP-format data to the routing manager 2b in step 72, which sends the CIP-format data to the protocol manager 2c in step 73. It is the protocol manager 2c in the internal robot 24 that finally re-translates the CIP-format data back into its native application format, possibly modifying the data the data in so doing. Thus the plain application-format data decrypted by the external robot 26 from communications received through the external bus, may not be identical to the clear data in native application format that is supplied to the trusted environment 14 by the network-security gateway 10 over the internal communication bus 20a.

Some additional acceptance test, such as tests directed to authorizing particular actions by particular users for access-control, may be applied to the data at this point in order to further verify the legitimacy of the data. Providence is made in the architecture of the present invention to allow for third party integration of processing modules, to enhance to adaptivity and flexibility of the system. These modules, hereinafter referred to as "Plug-In's," are callable at various places in the process flow of the apparatus, both in the external and the internal robots. An example of a useful such plug-in is the access-control as described immediately below, applied at the internal robot after the CIP is interpreted, possibly at the Protocol Entity level as described later with reference to FIGS. 5–7.

When such an access control plug-in is provided, the protocol manager controls access control through editing its rules. The protocol manager invokes access control by sending it four query parameters: actor, action, resource and attributes. Context-sensitive testing may be used to identify redundant messages that are received more than three times from the same source. The access-control plug-in must then also have reading access to the transactions log maintained by the security gateway 10 in order to make such context-sensitive determinations. For this reason, intrusion detection may also use the access-control interface to the log. The access control logic (ACL) may be extracted from monitoring network activity or by extracting rules from the responses of the network administrator to packets parsed under the control of the administrator. The concept of automatic and/or guided, semi-automatic recognition of flow, access-rules, access-lists and valid/invalid data is intended to supply, along with the apparatus itself, a utility which will intercept all the traffic to and from the secured servers, analyze this traffic and produce a list of users, their allowed activities, and other relevant parameters (time and date of the action, etc.). It is also intended to provide a utility which will extract access information from the server itself, be it a Windows/NT server (registry, etc.) or a UNIX station (/etc/passwd, etc.). ACL data is imported into the gateway 10, partly in off-time (initialization), and partly on-line (updates). Security standards implemented may include RADIUS and TACACS RAS standards, the TSS mainframe standard, or the modem alternatives: NIS, NT domain.

If it passes all such tests, at step 74 the protocol manager 2c sends the application-format data back to the routing manager 2b which determines its destination. If the data is to be sent directly to the application, it proceeds to step 101. If the data was addressed to the web-server, e.g., if its application format is HTTP, the routing manager 2b sends the application format data to the web proxy 2f at step 91, which re-encapsulates it as a TCP/IP packet, or whatever other suitable transfer protocol is in the protocol stacks being used by the web-server. At step 92 the web proxy 2f finally forwards the re-encapsulated data to the bus 20b. The web-server 12 in step 93 processes the data. It is expected that the web server 12 translates the data to some application format before transferring it back to the apparatus.

For example, when a user invokes a CGI script on the web-server 12 using a CGI request encapsulated in HTTP transfer protocol, and the CGI script translates that request into an application format, e.g. SQL or banking, the web-server 12 transmits the application format back (e.g. SQL query, banking command) to the network-security gateway 10, where the web proxy 2f receives it and removes the TCP/IP encapsulation of the application data in step 94, before sending the application data to the routing manager 2b.

In step 101 the routing manager 2b sends the application-format data to the application proxy 2e. The application proxy 2e re-encapsulates the application data in TCP/IP, or whatever protocol was used for communicating the data to the network-security gateway 10, and sends the data to the application server 14 in the internal environment 12 in step 102, whereupon the security-assurance processing in accordance with present invention, for that data, ends at step 104.

Figure 4A:
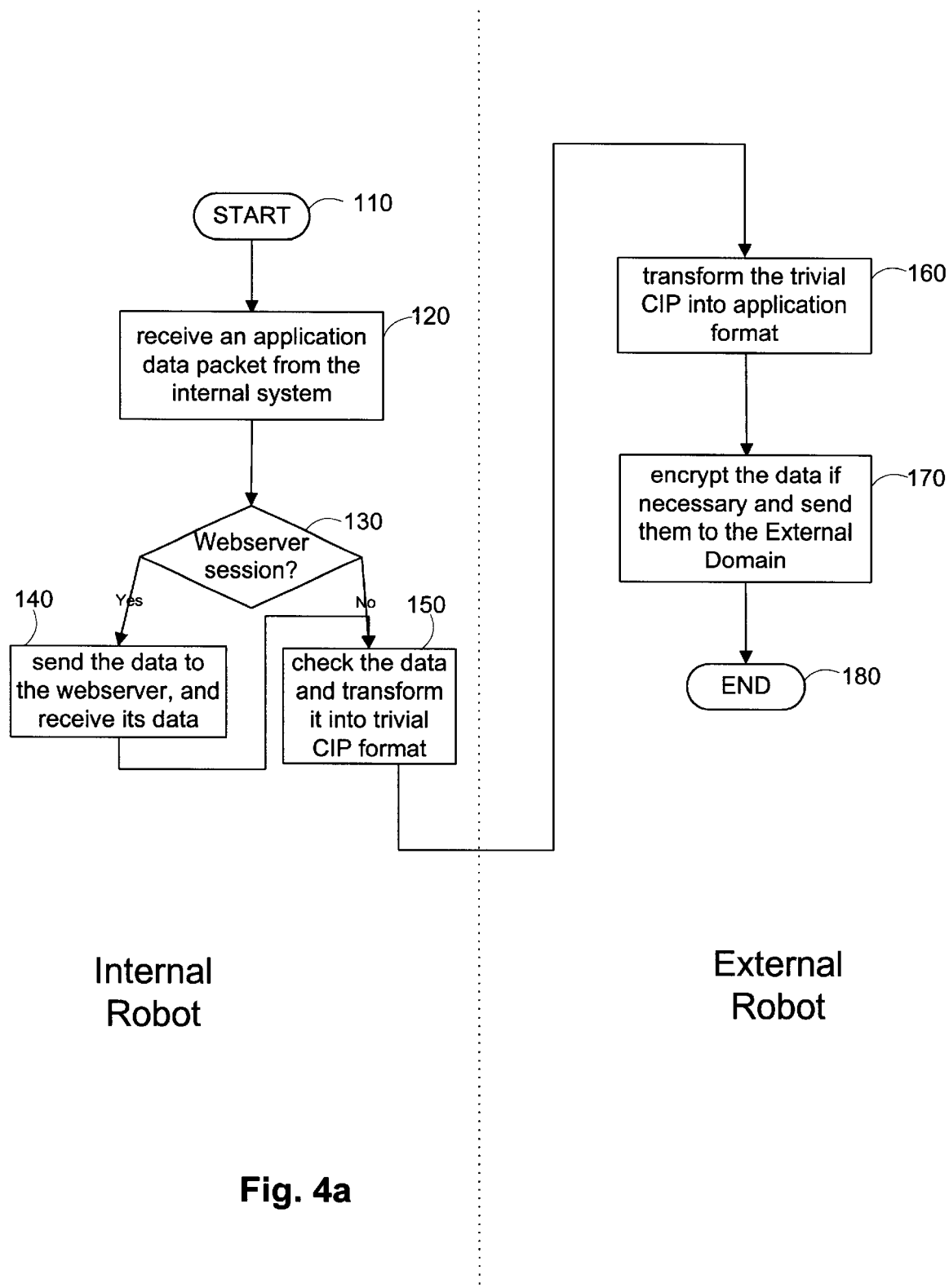
FIG. 4a is a flow chart showing a process of processing outgoing data performed by the apparatus of FIG. 1a in accordance with an embodiment of the present invention.

The reverse process performed by the gateway 10 of processing and transmitting outgoing data from the internal domain 12 into the external domain 16 is now described with reference to the flow charts in FIGS. 4a and 4b and with continued reference to the elements identified in FIGS. 1a, 2a, and 2b. Referring to FIG. 4a, processing by the gateway 10 of outgoing data begins at step 110. At step 120, the internal robot 24 receives application data from the internal system 12. At step 130, the destination of the data is determined: if it is originated from an indirect session (i.e., a session that involves a gateway, such as a web-server 13), then the data is relayed to the gateway (web-server), whereas if the data originated from a direct session (user client communicating directly with the internal system server 14), then the processing of the data proceeds directly to step 150.

While at the web-server 13, step 140, the data is translated and restructured by the web-server 13 in order to be presented in a web format (e.g., HTML page over HTTP protocol), and then sent back to the gateway 10, to be further processed. At this stage, execution proceeds at step 150. At step 150, the data is reduced into CIP format, possibly with some alterations, possibly with some filtering pertaining to the nature of the information, e.g., a "Top-Secret" titled article may not be allowed to pass out of the internal zone. Then the data is transmitted over the communication bus 28 into the external robot 26.

The external robot 26 re-composes the CIP format data back into application format, possibly with some changes to the data, step 160. It then proceeds to perform some communication security tasks associated with the data, such as encrypting it and/or affixing it with authentication data, and finally, the secure data is sent to the external zone 5, step 170, which completes the process, step 180.

Figure 4B:
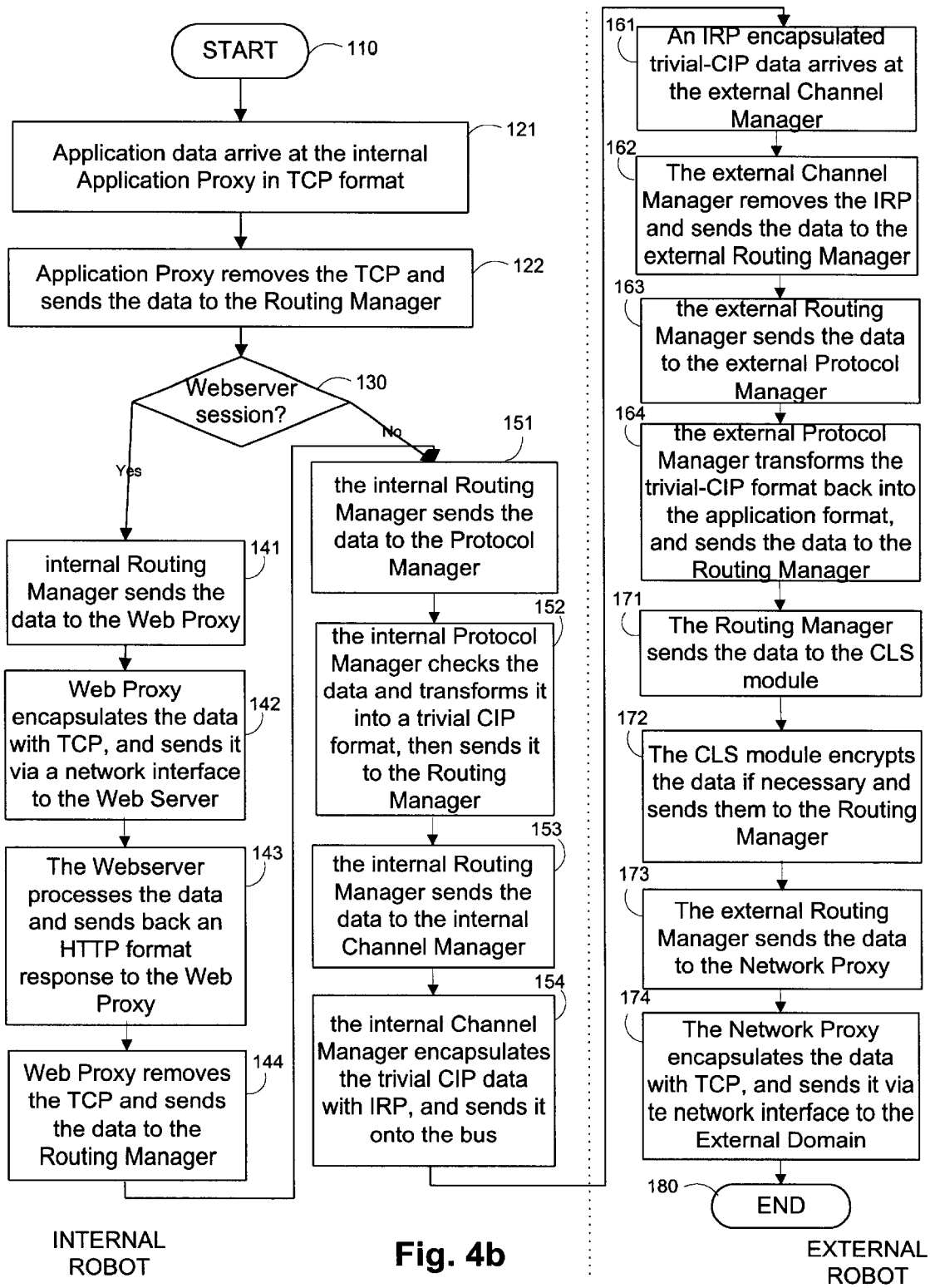
FIG. 4b is a flow chart showing the process shown in FIG. 4 in greater detail, referring to elements of the block diagrams shown in FIGS. 2a and 2b.

A more detailed representation of the process in shown in FIG. 4b. Beginning at step 110, application data arrives from the internal system 12 to the application proxy 2e, step 121. At step 122, the application proxy 2e removes the TCP/IP encapsulation (or whichever protocol used to communicate with the internal system's network) and sends the data (which is in application format) to the routing manager 2b. The Routing Manager 2b determines the destination of the data, step 130, according to its association with a session. If the data belongs to a direct session, that is, a session in which the client communicates directly with the internal system 14, the routing manager proceeds immediately to step 151. If, on the other hand, the data belongs to an indirect session in which the client communicates with a gateway such as a web-server 13, and the latter relays the information to and from the internal system, then the routing manager 2b sends the data to the web proxy 2f, step 141.

The web proxy 2f encapsulates the data in TCP/IP (or whichever protocol is used to communicate with the web-server 13 or any other gateways employed), and sends it to the web-server 13, step 142. The web-server 13 then processes the data, which is typically a reply to a previous query sent from the web-server 13 to the internal system 14 via the apparatus 10, and represents it in a web-format (e.g., typically, an HTML data "page" over HTTP protocol, all encapsulated in TCP/IP), and sends this data to the web proxy 2f, step 143. The web proxy 2f removes the TCP/IP (or any other protocol used for communication with the web-server) encapsulation, step 144, and sends the application data to the routing manager 2b.

In step 151, the routing manager 2b sends the application data to the protocol manager 2c. The protocol manager processes the data, step 152. This process may include performing several tests and/or modifications, in order to further protect the internal system 12 and carry out the security policy exercised in the internal domain. For example, it may refuse to forward documents or pages according to the information they carry, or it may remove or conceal some information or all based on its content. The protocol manager translates the data into CIP, which may be a different coding scheme than that of the incoming direction. At the end of step 152, the CIP data is sent to the routing manager 2b. The routing manager 2b at step 153 sends the data to the channel manager 2a. At step 154, the channel manager 2a encapsulates the CIP data with the IRP protocol used for the bus communications, and transmits the data over the communication bus 28 to the external robot 26.

In step 161, the data arrives through the communication bus 28 to the external robot 26, where it is handled by the external robot's channel manager 4a, step 162. The channel manager 4a removes the IRP encapsulation and sends the CIP data to the routing manager 4b. The routing manager 4b at step 163 sends the data to the external robot's protocol manager 4c. The protocol manager 4c translates the data from CIP format into application format, step 164, possibly with some alterations to the data. The data is then sent back to the routing manager 4b. In step 171, the Routing Manager 4b sends the application data to the CLS module 4d, which performs several communication security duties, step 172, such as encryption and affixing authentication information to the data, according to the security model employed (e.g. SSL). The CLS module 4d then sends the secure data back to the routing manager 4b. The routing manager 4b finally sends the data to the network proxy, step 173, where the application or secure data is encapsulated with TCP/IP (or whichever protocol used for communication with the client in the external zone 16), and sent to the external zone 16 using the NIC, step 174. The flow of information from the internal zone 12 to the external zone 16 is thus completed, step 180.

Structure and Operation of the Protocol Managers

The core of the robot operation is the protocol manager, denoted 2c and 4c in FIGS. 2b and 2a, respectively. The protocol managers provide translation between the various application formats used by application protocols that are authorized for use by and implemented through respective CIP protocols in the security gateway 10 and the CIP formats used internally by security gateway 10. The protocol managers 2c, 4c may also perform various other tasks, pertaining to the content of the data, such as access-control.

Figure 5:
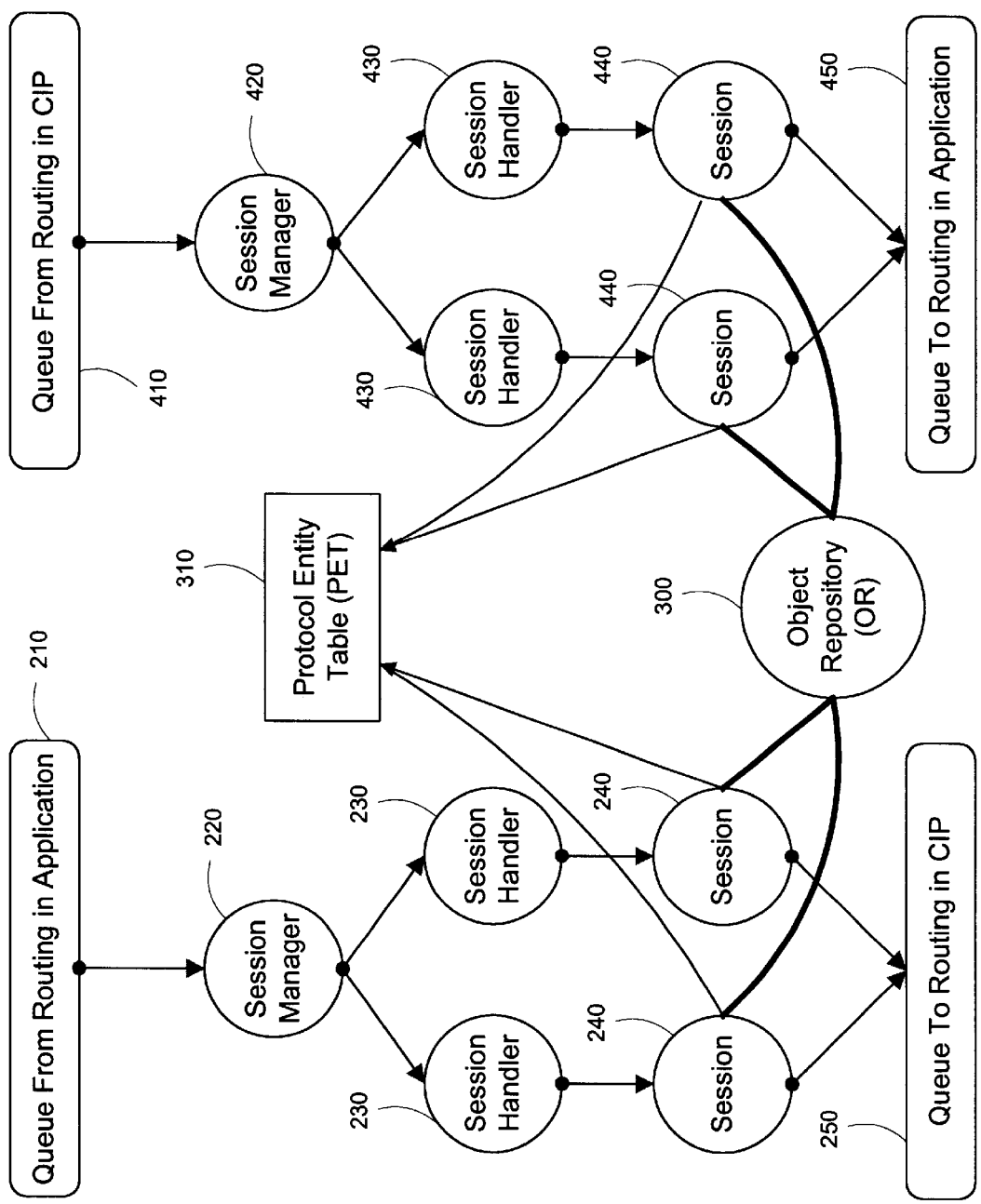
FIG. 5 is a flow diagram of the Protocol Manager module shown in FIGS. 2a and 2b.

As shown in FIG. 5, the protocol managers 2b and 4b have respective input queues 210, 410, and output queues 250, 450, several analogous processing entities between them, and two common objects. The internal input queue 210 holds data coming from a routing manager 2b, 4b that is in native application protocol format, and the external input queue 410 holds data from the routing manager, which is in CIP application format. The internal output queue 250 holds data going to a routing manager 2b or 4b in CIP application format after having been translated from the native application format into CIP, and the external output queue 450 holds data that was translated from CIP and is going to a routing manager 2b, 4b in native application format 50.

The processing objects between the input and output queues of the respective protocol managers 2c, 4c are session managers 220, 420, which provide workload balancing for their respective sets of session handlers 230, 430, each session handler handling a single session object 240, 440 at a time. The session handler 230, 430 determines where incoming data belongs, which "session", and if no such session is active the handler initiates one. The respective sets of session objects 240, 440 comprise generic session processors.

By combining the data currently being received by the protocol manager 2c, 4c and session records obtained from the object repository 300 of the protocol manager 2c, 4c each element in the respective sets of session objects 240, 440 processes a respective session, that is, a respective communication stream received by the security gateway as multiple, not necessarily contiguous packets. However, two sessions are usually combined into a single entity, a "twin-session", whenever there are two coupled sessions pertaining to the same circuit of information flow, namely that one session handles incoming data and the other handles outgoing data. The coupling is necessary in order for both the sessions to be synchronized in the state of the server and the context of the whole circuit. Similarly, a mechanism is provided for the internal robot (more accurately, the session objects of the internal robot) to be able to synchronize the session objects of the external robots, where the session objects of the internal robot will act as master and those of the external robot as slave in order to maintain security.

Each session object 240, 440 may also write data back to the object repository 300. The session objects 240, 440 also consult a protocol entities table (PET) 310, as described further below, to determine the sequence order prescribed by the applicable protocol for processing data received by the session object in a format prescribed by that protocol. The session objects each write the output of their respective translations and editing processes to a respective one of the output queues 250, 450.

The protocol managers' shared storage entities, the object repository 300 and PET 310, hold information that is at least more global or less temporary in nature than what is held in the queues 210, 250, 410, 450. The information in the object repository 300 is either global to the whole security gateway 10, or at least global for-each user or for each session, or session-wide, that is, global to a whole session as opposed to local information used in a single protocol layer or information used in a single packet. For example, a user-name entry in the object repository 300 is global to all the communications transmitted between the user and the server. The PET 310, on the other hand, is global in that it is used to enforce the rules by which a particular session object chooses which protocol entity to employ to reduce the data or reconstruct it.

Figure 6:
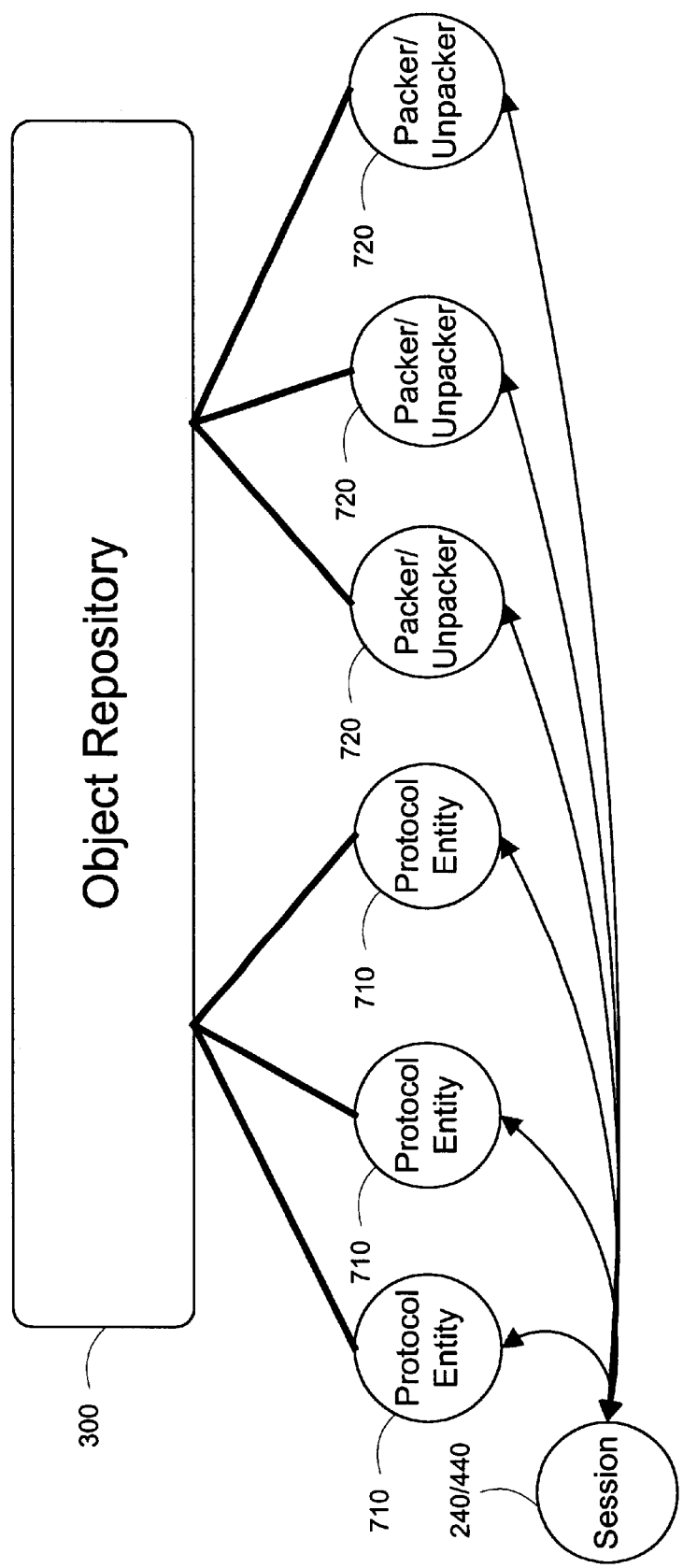
FIG. 6 is a block diagram of the object repository and a session submodule for the apparatus shown in FIG. 5.

A block diagram of one of the session objects is shown in FIG. 6. A session object 240, 440, employs various protocol entities 710 for handling the different protocols encountered within the data within a session. The session object 240, 440 consults the PET 310 in order to determine which protocol entity 710 to use next. The protocol entities 710 deposit information to and retrieve information from the object repository 300. That done, the session object 240, 440 then calls packers/unpackers 720 corresponding to those same protocols reflected in the selection of the protocol entities 710, in order to streamline the required information deposited in the object repository 300 into a sequence of bytes to be output by the session object 240, 440.

Figure 7:
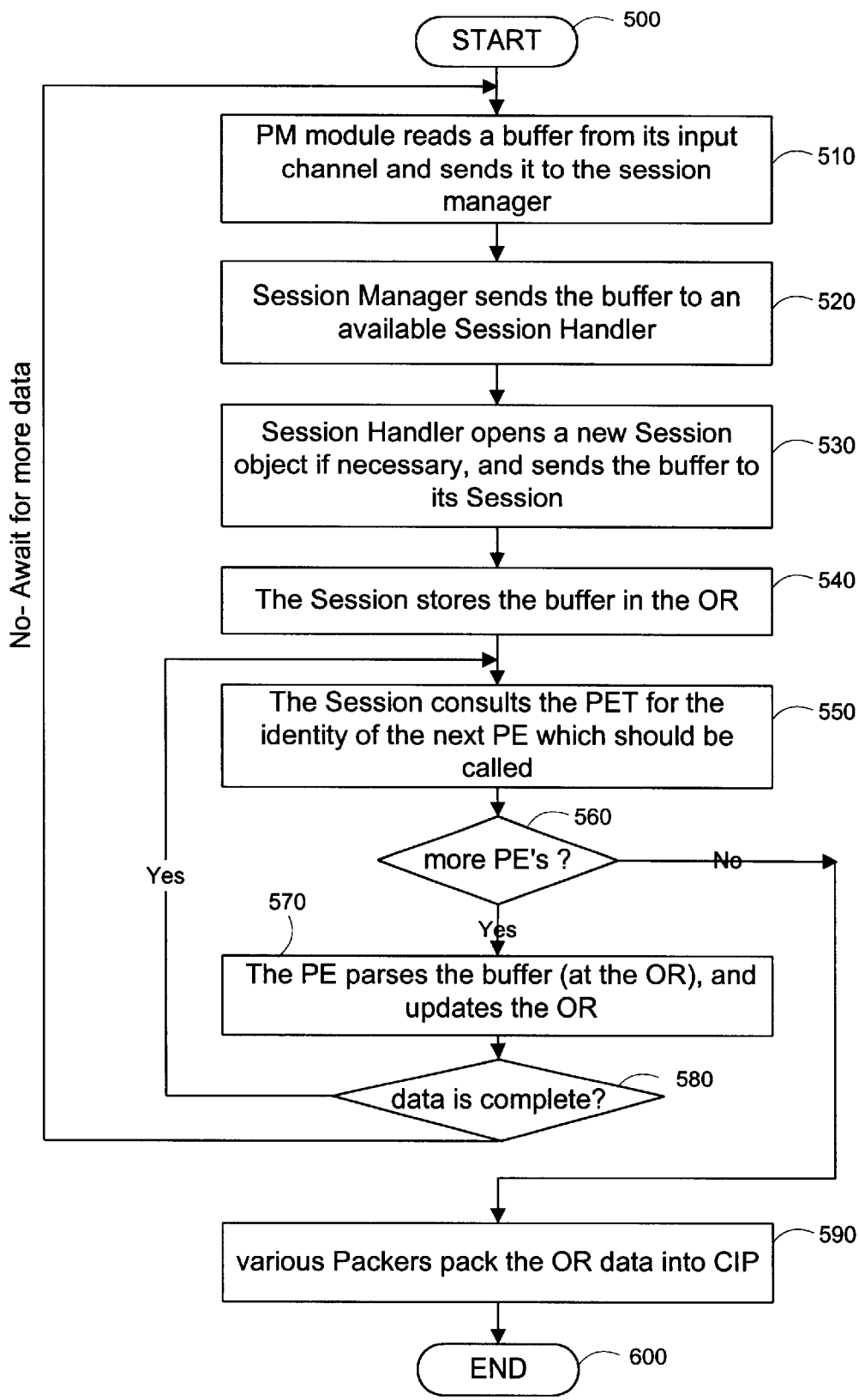
FIG. 7 is a flow diagram showing a process for converting data from an application protocol to a simplified internal protocol in accordance with one embodiment of the present invention.

The flow of data coming in to the security gateway 10 in application format through the protocol manager 2c and 4c is shown in FIG. 7. The data arrives in its native application format at step 500 and is read by the protocol manager 2c and 4c from the queue 210 containing data coming from the routing managers 2b, 4b. This application-format data is then transferred to the session manager 220 at step 510. At step 520 the session manager 220 locates an available session handler 230, and sends the data buffer to that session hander.

At step 530, the session handler 230 scans the sessions currently active or "open", to determine which session the data belongs to before sending the data to the corresponding session object 240 for processing. If the data does not belong to one of the open sessions, the session handler 230 initiates a new session object 240 and sends the data, all this comprising step 530. The session object 240 begins by storing the data buffer in the object repository (OR) 300, step 540. The session object 240 then consults the PET 310 to get the identity of the next protocol entity 710 that should be used to process the data, reducing it to clear data in CIP format at step 550. If other protocol entities are needed to process the data, then the data is handed on to the next protocol entity 710 for processing in step 560, that protocol entity 710 retrieves the data from the buffer in the OR 300 and deposits the processed result there in step 570 when its process is complete.

When the data has been completely processed by the protocol entity 710 currently processing it at step 580, the session object repeats step 550 to check whether more protocol entities are needed for the data. Should the data provided in the buffer stored in the OR 300 end before the protocol is satisfied, the data is assumed to be incomplete at step 580. If the data is incomplete, the protocol entity 710 and the session object 240, 440 cannot complete their respective tasks, so another buffer is read from the input channel, repeating step 510, and the session object waits until further data for this session is sent to it by the session manager.

If no more protocol entities are needed at step 560, the session object 240 uses the packers 720 corresponding to the protocol entities used by the session object to pack the data from the buffer in the OR 300 into a serial stream of bytes, at step 590. This CIP-formatted stream of bytes is transferred to the output queue 250 going to the routing manager. At this point, the processing cycle is complete, step 600.

Figure 8:
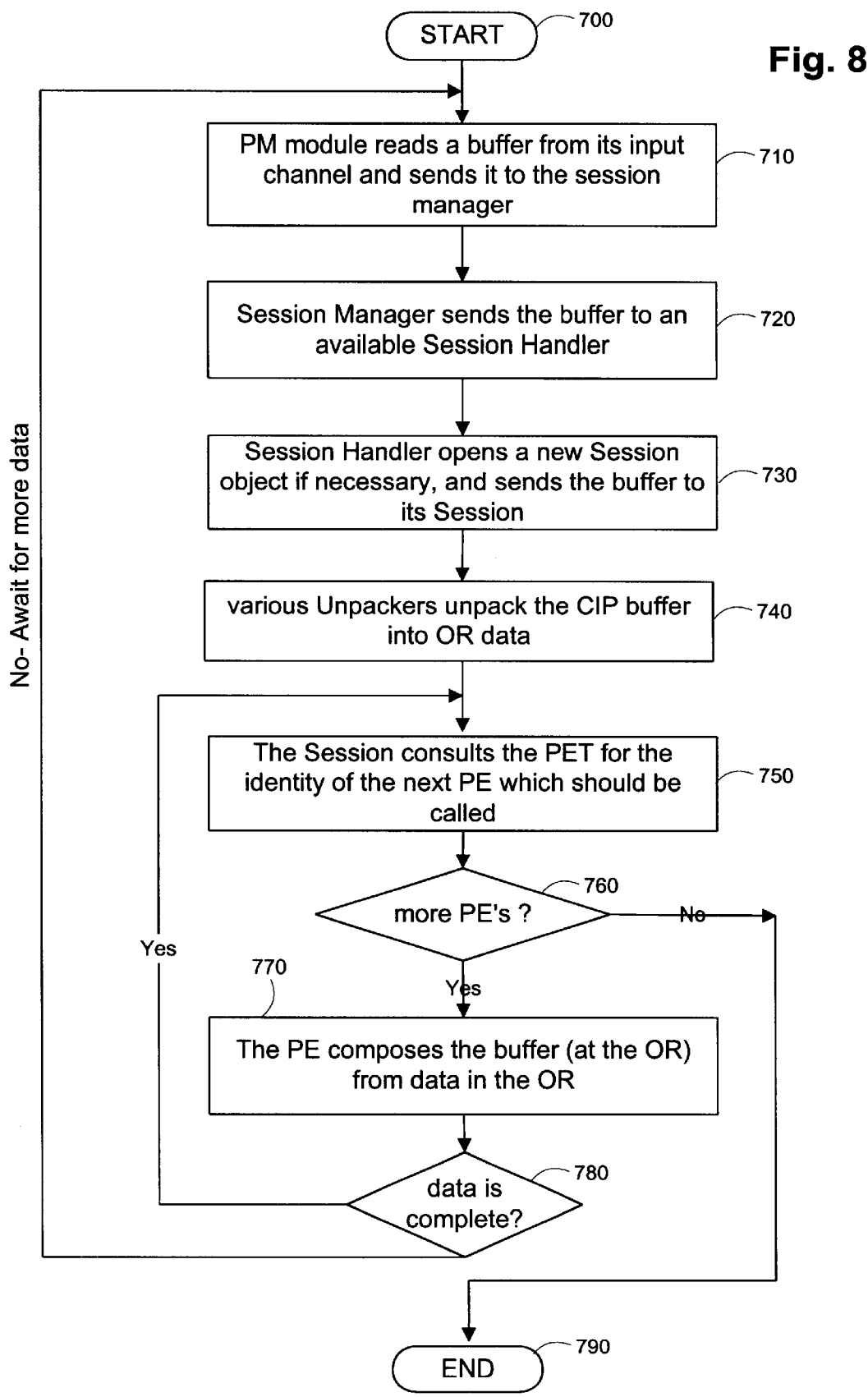
FIG. 8 is a flow diagram showing a process for converting data from a simplified internal protocol to an application protocol in accordance with one embodiment of the present invention.

Referring to FIG. 8, the process of converting content data from CIP to application format is described and starts at step 700. The protocol manager 2c and 4c reads data from the input queue 410 and sends the data to the session manager 420, step 710. Next, the session manager 420 sends the data buffer to one of the available session handlers 430, step 720. The available session handler checks whether the data belongs to an existing session or whether a new session needs to be created.

The session handler then sends the data to the appropriate session object 440, step 730. The session object 440 uses various unpackers 720 to unpack the CIP information included in the data and stores the individual data items in the OR 300, step 740. The session object 440, at step 750, consults the PET 310 and information in the OR 300 for the identity of the next Protocol Entity that should process the data which is now in the Object Repository 300. If there is such a Protocol Entity 710, step 760, the control passes to it, and that Protocol Entity 710 reconstruct its application layer data from the data in the OR 300, step 770. At step 780, the Protocol Entity 710 determines if the operation is completed, upon which case execution resumes at step 750 by determining the next Protocol Entity. Otherwise, execution proceeds at the beginning, where more data is awaited, step 710.

When all Protocol Entities are exhausted, step 760, the reconstructed data (which is deposited in the Object Repository 310) is sent to the "Queue To Routing in Application" 450, and the process cycle is complete 790.

A sample PET 310 is shown in FIG. 9. As seen in the drawing, the PET 310 indicates which Protocol Entities are selected at given points, such as the start of the processing (when the TCP/IP Protocol entity is used), and thereafter. The PET 310 also indicates what rules and conditions are required to trigger use of the given Protocol Entity. As explained above, the session handlers consult the PET 310 to determine which Protocol Entities are to be employed at given stages in the conversion process.

The CIP and IRP Protocols

In accordance with the present invention, the security gateway's internal CIP and IRP protocols replace a message's native protocols in the link between the robots. In this way, data transfer is implemented only for specified data content within a given protocol. For instance, when a message using a particular application protocol is decomposed by the external robot the external robot's CIP translator for that protocol may encode only the image information that provides the application's GUI. Similarly, the internal robot's translator may implement CIP encoding only for the user's mouse and keyboard input responding to those graphics. In this instance, command codes are not passed.

The process that defines permissible sub-set of the syntax and the functional suite of a given protocol that is to be allowed to pass into the trusted environment, as well as defining its representation in CIP, is carried out in several separate steps, occurring at different times in the robot processes. First, the user identifies the set of protocols or protocol characteristics that will be allowed to pass into the trusted environment. This can be conveniently done in a fourth generation language (4GL) referred to as protocol-definition language ("PeDaL"), which handles string literals, and provides a binary virtual machine language (VML) to replacing "C" as the target language.

Selected command codes may also be passed, by being either explicitly or implicitly coded by the translator. For example, a bill-viewing application can be secured in accordance with the present invention by generating a corresponding CIP protocol, using normative rules used by the messages native protocol and selecting from the native protocol only content that the network administrator of the secure environment deems to be secure from attacks that could use the bill-viewing application as vehicle for entering the trusted environment.

For the sake of simplicity, assume that only the following commands and flow sequences are defined by the bill-viewing protocol:

1) The "LOGIN" command should be issued, with "username" (8 characters exactly) and "password" (8 characters exactly) as its arguments; then
2) The user may choose to issue one of three commands: PRINT, VIEW or LOGOUT to either produce a print-out of a bill, to view a bill on the screen, or to quit the application, respectively. However, when response to a PRINT or VIEW command has been completed, the system is ready to receive a new command. In contrast, after receiving the LOGOUT command, the system resets to its initial state, and so, responds only to a LOGIN command thereafter.

The corresponding CIP protocol format for command sequences compliant with the bill-viewer's native application protocol is as follows:

1) The unknown structured string of 16 bytes representing a username+password (first 8 bytes represent the 8 characters of the username, in ASCII code, and the last 8 bytes represent the password in ASCII code) pair come first in this format.
2) One of the known limited set of strings:, three commands: 0 and 3 for PRINT, 1 for VIEW and 2 for LOGOUT, is identified in the next two bits,
3) The commands PRINT (=0 or =3) and VIEW (=1) can be followed by any other command identifier., whereas
4) The command LOGOUT ends any sequence.

After an initial valid string of sixteen characters is received the interpreter responds in one of two ways: Any time a CIP interpreter receives a LOGOUT command, coded as "2", the interpreter resets to its initial state and awaits the next 16-byte sequence. If PRINT (=0 or =3) or VIEW (=1) appear instead, the interpreter will then respond to any of the three commands' codes. Since every sequence of bits must have a valid interpretation, having three commands represented by two bits makes one of the bit combinations superfluous. As still an interpretation is needed for the redundant combination, an arbitrary command is chosen to be represented also by this combination, in this example, the PRINT command.

Note that the LOGIN command is, in effect, a "constant" string. Therefore it is not explicitly coded by the CIP protocol. LOGIN can be implicitly passed and reinserted by the complementary interpreter in the other robot, because at the time when the sixteen character string is received, no command other than LOGIN can be processed by the interpreter, nor is LOGIN processed under any other circumstances. Therefore there is no point in explicitly providing a command-identifier value for LOGIN or other such "constant strings".

Numbers are accompanied by a logically associated "sanity range" for consistency checking, except for dates. Only a single date format is allowed from any one given CIP translator or interpreter. Similarly, unknown, unstructured strings are provided a "sanity check" value stating an expected length limit for the string. The elements of the string are preferably mapped to a sequential range of characters.

Thus this CIP coding process simultaneously clears application-level messages of suspect classes of data and verifies the integrity of the internal robot, because corruption of the translator operation will produce a sequence of (although meaningless) valid commands, which do not harm the internal zone.

The IRP is a simplified transfer protocol adapted for use in a point-to-point communication link such as between the internal and external robots. Since the communication is point-to-point, no routing information is needed in the transfer protocol. In one embodiment, the IRP consists of a header to the CIP data having twelve bytes, of which four are used as follows, with the remaining bytes being made available for reserved uses:

the first byte is NULL;

the second byte contains a packet ID, i.e., a number from 0 to 127, for which a static variable is used to track and increment assigned packet IDs; and the third and fourth bytes contain the length of the data in the CIP message.

Formal Verification

For a security software product to fulfill its role, it should be totally reliable, i.e., the product must be proven to show it complies with its specification. The unique combination of ART algorithm/technology, and the specific architectures described, i.e. strongly decoupling the two robots, with a single link between them, enables one to prove the whole security gateway by verifying the correctness of the internal robot only. This is so because according to the use of reduction methodology as described herein, anything sent on the communication bus has a valid interpretation by the internal robot, assuming it is verified, although that interpretation may be to meaningless data, as explained above. Furthermore, the separation of the security tasks into internal robot and external robot, keeping the internal robot as simple as possible by having all the "heavy" work, e.g. parsing protocols, carried out in the external robot, and furthermore using a simple point-to-point inter-robot protocol such as IRP to simplify the bus driver, makes verifying the internal robot a practical goal.

In order to formally verify the internal robot, it may be useful to take the top-down approach, assuming first that the robot modules (PM, RM, CM, App-Proxy, Web-Proxy) are verified, proving that their combination yields the desired properties (proper interpretation of the input to CM, i.e. the output from the Web-proxy and the application proxy should comply with the specifications provided by the owners of the internal applications.

The properties of each module can be expressed in terms of the output it produces, e.g., in the various output channels available to it—whether as memory area in a shared memory, or as I/O ports connected to peripheral equipment/ devices, assuming the input it receives is in a preset format. This enables the verification of the overall property by means of an individual module verification in terms of I/O channels. Abstracting unnecessary information, such a system can be described by a specification language such as CSP or its derivatives, and be proven by such tools as SPIN and FDR2.

Therefore, verifying the internal robot amounts to verifying each module against its output channel properties, assuming the correctness of its input channels.

Then, one may proceed to proving each individual module, again by decomposing it to its sub-modules. The process of decomposition repeats itself down to the level of "atomic" code pieces, e.g. functions and procedures, where the decomposition can no longer be applied. However, these code pieces are usually small, therefore are verifiable by "direct" methods. These methods may include manual arguments, as well as mechanised methods such as theorem provers (NQTHM, ACL2, PVS) and model checkers (SPIN, STeP, etc.).

The invention has been described with particular reference to presently preferred embodiments thereof, but it will be apparent to one skilled in the art that variations and modification are possible within the spirit and scope of the invention. For example, these embodiments have placed the invention between a local, trusted environment and an external, untrusted environment, but it also could be used as a containment device mediating between mutually risky environments.

What is claimed is:

1. A system for allowing limited communication between an external computing environment and an internal computing environment, the system comprising:

a first processing entity for receiving an external message from the external environment, the external message containing content represented in one or more external environment protocols, for converting the external message to a simplified message by mapping all or part of the external message content into a simplified representation of the content in accordance with a simplified protocol, the simplified protocol defining a simplified representation for only some content which may be contained in a message represented in the one or more external environment protocols, and for transmitting the simplified message;

a second processing entity for receiving the simplified message transmitted by the first processing entity, for converting the simplified message to an internal message by mapping the simplified representation of the content into an internal representation of the content in accordance with one or more internal environment protocols, and for transmitting the internal message to an application operating on the internal computing environment; and a communication channel between the first and second processing entities for transferring the simplified message.

2. The system of claim 1, wherein the second processing entity is further capable of receiving an internal message from the application operating on the internal computing environment, the internal message containing second content represented in the internal protocol, for converting the internal message into a simplified message by mapping all or part of the second content into a simplified representation of the second content in accordance with the simplified protocol, and transmitting the simplified message to the second processing entity via the communication channel.

3. The system of claim 2, wherein the first processing entity is further capable of receiving a simplified message from the second processing entity, converting the simplified message to an external message by mapping the simplified representation of the second content into an external environment representation of the second content in accordance with the external environment protocol, and transmitting the external message to the external computing environment.

4. The system of claim 3, wherein the first and second processing entities each comprise a channel manager for encapsulating the simplified message to be transmitted with a communication channel transfer protocol and for removing the communication channel transfer protocol from a received simplified message.

5. The system of claim 4, wherein the step of encapsulating the simplified message with a communication channel transfer protocol comprises adding a header to the simplified message which contains no routing information.

6. The system of claim 3, wherein the first and second processing entities each comprise a protocol manager for converting a simplified message to an external or internal message, respectively, and for converting an external or internal message, respectively, to a simplified message.

7. The system of claim 6, wherein the protocol manager comprises a plurality of protocol entities, each protocol entity mapping content represented in simplified representation to one of a plurality of external environment or internal environment representations or mapping content represented in one of the plurality of external environment or internal environment representations to the simplified representation.

8. The system of claim 7, wherein the protocol manager comprises a protocol entity table for use in selecting one of the plurality of protocol entities for use in mapping content a given message.

9. The system of claim 1, wherein the first processing entity comprises a first central processing unit and the second processing entity comprises a second central processing unit.

10. The system of claim 1, wherein the first and second processing entities reside on a single central processing unit and are separated by a secured sharing program operating on the central processing unit.

11. The system of claim 1, wherein the communication channel transfers messages only between the first and second processing entities.

12. The system of claim 1, comprises means for allowing users to define a subset of all content which may be contained in a message represented in the external environment protocol as having simplified representations in the simplified protocol.

13. The system of claim 12, wherein the simplified protocol defines simplified representations for a subset of all content which may be contained in a message represented in the external environment protocol, the subset excluding content which may cause harm to the internal computing environment.

14. A method for allowing limited communication between an external computing environment and an internal computing environment, the method comprising:

receiving an external message from the external computing environment, the message comprising content represented in one or more external environment protocols;

reducing the received external message to a simplified message by mapping all or part of the external message content into simplified representations of the content in accordance with a simplified protocol, the simplified protocol defining simplified representations for only some content which may be contained in a message represented in the one or more external environment protocol;

converting the simplified message to an internal message by mapping the simplified representation of the content in the simplified message into an internal environment representation of the content in accordance with one or more internal environment protocols; and transferring the application message to an application operating on the internal computing environment.

15. The method of claim 14, wherein the steps of receiving an external message and reducing the external message to the simplified message are performed on a first processing entity and the steps of converting the simplified message to the internal message and transferring the internal message to the application are performed on a second processing entity, the method comprising transmitting the simplified message from the first processing entity to the second processing entity over a communication channel.

16. The method of claim 15, comprising encapsulating the simplified message with a communication channel transfer protocol before transmitting the simplified message, and removing the communication channel transfer protocol from the simplified message before converting the simplified message to the application message.

17. The method of claim 14, comprising:

receiving an internal message from the application operating on the internal computing environment, the internal message containing application content represented in one or more internal environment protocols;

reducing the received internal message to a simplified message comprising all or part of the application content;

converting the simplified message to an external message; and transmitting the external message to the external computing environment.

18. The method of claim 17, wherein the step of reducing the received internal message to the simplified message comprises mapping all or part of the application content into the simplified representation of the application content in accordance with the simplified protocol.

19. The method of claim 18, wherein the step of converting the simplified message to the external message comprises mapping the application content contained in the simplified message into an external environment representation of the application content in accordance with one of a plurality of external environment protocols.

20. The method of claim 19, wherein the step of converting the simplified message to the external message further comprises encapsulating the mapped application content in one or more transfer communication protocols for the external computing environment.

21. The method of claim 14, wherein a first part of the external message content is not defined by simplified representations in the simplified protocol, and wherein the step of reducing the received external message to the simplified message comprises mapping only a second part of the external message content into simplified representations.

22. A system for allowing limited communication between an internal computing environment and an external computing environment, the system comprising:

a first processing entity for receiving an application message from an application operating on the internal computing environment, the application message containing application content represented in one or more internal environment protocols, for converting the application message into a simplified message by mapping all or part of the application content into a simplified representation of the application content in accordance with a simplified protocol, the simplified protocol defining simplified representations for only some content which may be contained in a message represented in the application protocol, and for transmitting the simplified message;

a second processing entity for receiving the simplified message from the first processing entity, converting the simplified message to an external message by mapping the simplified representation of the application content into an external environment representation of the second content in accordance with one or more external environment protocols, and transmitting the external message to the external computing environment; and a communication channel between the first and second processing entities for transferring the simplified message.

23. A method for allowing limited communication between an internal computing environment and an external computing environment, the method comprising:

receiving an application message from an application operating on the internal computing environment, the application message containing application content represented in one or more internal environment protocols;

reducing the received application message to a simplified message comprising all or part of the application content by mapping all or part of the application content into the simplified representation of the application content in accordance with a simplified protocol, the simplified protocol defining simplified representations for only some content which may be contained in a message represented in the one or more internal environment protocols;

converting the simplified message to an external message by mapping the simplified representation of the application content in the simplified message into an external environment representation of the content in accordance with one or more external environment protocols; and transmitting the external message to the external computing environment.

24. A method for enabling formal verification of a system, the system comprising a first processing entity and a second processing entity connected by a communication bus, the first processing entity being connected to an untrusted computing environment and the second processing entity being connected to a trusted computing environment, the method comprising:

providing a simplified communication protocol between the first and second processing entities comprising data for transferring messages only between the first and second processing entities; and formally verifying only the second processing entity.

* * * * *

UNITED STATES PATENT AND TRADEMARK OFFICE
CERTIFICATE OF CORRECTION

PATENT NO.     : 6,321,337 B1
DATED          : November 20, 2001
INVENTOR(S)    : Reshef et al.

It is certified that error appears in the above-identified patent and that said Letters Patent is hereby corrected as shown below:

<u>Title page,</u>
Item [56], References Cited, U.S. PATENT DOCUMENTS, after "5,623,601 4/1997 Vu.", insert -- 5,629,981 5/1997 Nerlikar. --

Signed and Sealed this

Twenty-second Day of July, 2003

JAMES E. ROGAN
*Director of the United States Patent and Trademark Office*